United States Patent [19]

Boeckh et al.

[11] Patent Number: 5,972,508

[45] Date of Patent: *Oct. 26, 1999

[54] MICROCAPSULES CONTAINING BLEACHING AIDS

[75] Inventors: Dieter Boeckh, Limburgerhof; Birgit Potthoff-Karl, Ludwigshafen; Werner Bertleff, Viernheim; Peter Neumann, Mannheim; Ekkehard Jahns, Weinheim; Ralf Biastoch; Thomas Wehlage, both of Speyer, all of Germany

[73] Assignee: BASF Aktiengesellschaft, Ludwigshafen, Germany

[ * ] Notice: This patent is subject to a terminal disclaimer.

[21] Appl. No.: 08/962,547

[22] Filed: Oct. 31, 1997

[30] Foreign Application Priority Data

Oct. 31, 1996 [DE] Germany .......................... 196 45 024

[51] Int. Cl.⁶ .................................................. C11D 3/395
[52] U.S. Cl. .............................. 428/402.2; 428/402.21; 428/402.22; 428/402.24; 427/213.3; 427/213.31; 427/213.33; 427/213.34
[58] Field of Search ........................ 428/402.2, 402.21, 428/402.22, 402.24; 427/213.3, 213.31, 213.33, 213.34

[56] References Cited

U.S. PATENT DOCUMENTS

| | | |
|---|---|---|
| 3,666,680 | 5/1972 | Briggs . |
| 3,908,045 | 9/1975 | Alterman et al. ........................ 427/213 |
| 4,078,099 | 3/1978 | Mazzola ................................... 427/213 |
| 5,281,356 | 1/1994 | Tsaur et al. . |
| 5,596,051 | 1/1997 | Jahns et al. ......................... 428/402.22 |

FOREIGN PATENT DOCUMENTS

| | | |
|---|---|---|
| 0 653 485 | 5/1995 | European Pat. Off. . |
| 0 691 398 | 1/1996 | European Pat. Off. . |
| 43 21 205 | 1/1995 | Germany . |
| WO 93/22417 | 11/1993 | WIPO . |

*Primary Examiner*—Nathan M. Nutter
*Attorney, Agent, or Firm*—Oblon, Spivak, McClelland, Maier & Neustadt, P.C.

[57] ABSTRACT

The microcapsules containing bleaching agents are obtainable by polymerizing monomer mixtures which comprise

- 5–100% by weight of at least one ethylenically unsaturated carboxylic anhydride (a),
- 0–95% by weight of at least one monoethylenically unsaturated monomer (b) different from the monomers of group (a),
- 0–80% by weight of crosslinking monomers (c) which have at least two nonconjugated monoethylenic double bonds in the molecule, and
- 0–20% by weight of water-soluble monoethylenically unsaturated monomers (d), where the total of components (a) to (d) is 100% by weight. The polymerization takes place in the oil phase of a stable oil-in-water emulsion in the presence of free-radical polymerization initiators, where the temperature of the polymerizing reaction mixture is, where appropriate, increased continuously or periodically during the polymerization. The oil phase contains or consists of the bleaching aid.

15 Claims, No Drawings

MICROCAPSULES CONTAINING BLEACHING AIDS

The invention relates to microcapsules containing bleaching aids, to a process for their production, and to detergents and cleaners containing these.

Various processes for encapsulating substances, including bleaching aids, are known.

U.S. Pat. No. 3,908,045 discloses an encapsulation process for particles in which a nonaqueous solution of a coating substance is sprayed from a nozzle onto a fluidized bed of the particles to be coated. The coating substance used is a fatty acid having 12–20 carbon atoms, especially for coating chlorine-releasing agents used as bleaches. Further substances mentioned are sodium perborate, enzymes, optical brighteners, sodium acetylsalicylate, antibacterial agents, and polyethylene terephthalate copolymers. It is possible if required to carry out a second coating with a solution of an alkali metal hydroxide.

U.S. Pat. No. 4,078,099 discloses a process for coating bleaches, especially chlorine bleaches, in which they are sprayed in a drum mixer with molten fatty acids. It is possible to spray on one or more layers, and the subsequent layers can be different from the first, for example may contain a fatty acid and polyoxyethylene/polyoxypropylene copolymer. The fatty acids contain 12–20 carbon atoms.

The disadvantage of these spray processes is that the capsule material must be either melted or dissolved in a suitable solvent. When polymeric capsule materials are used, moreover, the viscosity of the solution may make the spraying difficult or impossible. In addition, the temperature range which is necessary for some polymers often cannot be used in the fluidized bed process. Defined capsule thicknesses are difficult to produce.

In addition, in this type of encapsulation the bleach must be in the solid state.

EP-A1-0 653 485 discloses detergent compositions which contain capsules which are filled with oily dispersions of enzymes or bleach catalysts. The capsules themselves are composed of a polymer which is soluble or dispersable in water. The capsules are precipitated from an oily dispersion in an aqueous solution of the polymer by mixing with a nonsolvent for the polymer. The capsule may moreover be formed around the oily dispersion in an extrusion process from a polymer solution. The capsule is said to be insoluble in a liquid detergent composition but to dissolve rapidly on use in the wash liquor produced therefrom. A polymer solution which contains polyvinyl alcohol/polystyrene or polyvinyl alcohol and an alkali-soluble emulsion thickener or an alkali-soluble polymer or a polyacrylate latex with a carboxylic acid is used.

It is not always possible to obtain defined uniform capsule thicknesses. In addition, the capsules rapidly dissolve in wash liquors.

It is an object of the present invention to provide liquid or solid bleaching aids in a form in which they can be stored in detergent formulations without adversely affecting other detergent components, and which permits defined delayed release of the bleaching aid in a detergent or cleaning liquor.

We have found that this object is achieved by microcapsules which contain bleaching aids and are obtainable by polymerizing monomer mixtures which comprise 5–100% by weight of at least one ethylenically unsaturated carboxylic anhydride (a), 0–95% by weight of at least one monoethylenically unsaturated monomer (b) different from the monomers of group (a), 0–80% by weight of crosslinking monomers (c) which have at least two nonconjugated monoethylenic double bonds in the molecule, and 0–20% by weight of water-soluble monoethylenically unsaturated monomers (d), where the total of components (a) to (d) is 100% by weight, in the oil phase of a stable oil-in-water emulsion in the presence of free-radical polymerization initiators, where the temperature of the polymerizing reaction mixture is, where appropriate, increased continuously or periodically during the polymerization, and where the oil phase contains or consists of the bleaching aid. Further solutions are a process for producing such microcapsules and detergents containing these.

Microcapsules of this type are known per se and described, for example, in DE-A 43 21 205.

The process for producing microcapsules containing bleaching aids comprises polymerizing monomer mixtures which comprise 5–100% by weight of at least one ethylenically unsaturated carboxylic anhydride (a), 0–95% by weight of at least one monoethylenically unsaturated monomer (b) different from the monomers of group (a), 0–80% by weight of crosslinking monomers (c) which have at least two nonconjugated monoethylenic double bonds in the molecule, and 0–20% by weight of water-soluble monoethylenically unsaturated monomers (d), where the total of components (a) to (d) is 100% by weight, in the oil phase of a stable oil-in-water emulsion in the presence of free-radical polymerization ainitiators, where the temperature of the polymerizing reaction mixture is, where appropriate, increased continuously or periodically during the polymerization, and where the oil phase contains or consists of the bleaching aid.

The production process is known per se and described, for example, in DE-A 43 21 205.

Thus, the difference between the microencapsulation according to the invention and known processes is that a polymer shell is produced in situ around a liquid drop by polymerization of monomers capable of free-radical polymerization. There is thus no precipitation of a previously prepared polymer to produce the capsule. This in situ encapsulation makes it possible to include liquids, especially oils, in the microcapsules. It is thus possible for bleaching aids which are liquids or are dissolved or dispersed in oil to be packaged by the capsule formation according to the invention. It was not to be expected that the bleaching aids, especially bleach activators, could be encapsulated by the process according to the invention because the bleaching aids, especially bleach activators, contain reaction centers which should act as polymerization regulators in free-radical polymerizations. It is nevertheless possible according to the invention to achieve free-radical polymerization of the monomers to produce tightly closed capsules around the bleaching aids.

The invention additionally relates to the use of the microcapsules described above for the controlled release of bleaching aids present in the core material of the microcapsules, by destruction of their shell resulting from the action of aqueous bases.

The shell of the microcapsules is composed of a polymer which contains carboxylic anhydride groups.

The group (a) monomers employed are ethylenically unsaturated carboxylic anhydrides. These can be anhydrides of ethylenically unsaturated dicarboxylic acids and/or anhydrides of unsaturated monocarboxylic acids. Ethylenically unsaturated internal anhydrides of dicarboxylic acids are incorporated into the polymer chain without crosslinking occurring in the molecule. Anhydrides of unsaturated monocarboxylic acids have two ethylenic double bonds which make crosslinking of the polymer possible during the polymerization. They are thus also suitable as crosslinking monomer (c). The incorporation of internal anhydrides of dicarboxylic acids results in anhydrides which are hydrolyzed in water slowly by comparison with anhydrides of unsaturated monocarboxylic acids, which are hydrolyzed more easily. It is possible, by setting a suitable ratio of the anhydrides, to determine within a wide range the hydrolysis sensitivity of the resulting polymers and the capsules obtained therewith. Monoethylenically unsaturated monocarboxylic acids which are able to form anhydrides with one another or with different monocarboxylic acids or with dicarboxylic anhydrides generally have from 3 to 20, preferably 3 to 12, in particular 3 to 6, carbon atoms. They may thus be symmetrical or unsymmetrical anhydrides of the unsaturated monocarboxylic acids. Examples of suitable monoethylenically unsaturated monocarboxylic acids are acrylic acid, methacrylic acid, ethylacrylic acid, allylacetic acid, crotonic acid, vinylacetic acid, or the like. Monoethylenically unsaturated dicarboxylic acids are able to form internal anhydrides or anhydrides with other dicarboxylic acids or monocarboxylic acids, in which case the remaining acid functionalities may be in the form of esters, amides or salts. They then have properties similar to those of monocarboxylic anhydrides. Suitable monoethylenically unsaturated dicarboxylic acids are maleic acid, mono- and dialkylmaleic acid with $C_{1-12}$, preferably $C_{1-6}$ alkyl radicals, monoalkyl maleates, where the alkyl radical has an appropriate number of carbon atoms, itaconic acid, mesaconic acid, fumaric acid, citraconic acid, methylenemalonic acid. Internal anhydrides of monoethylenically unsaturated dicarboxylic acids are in the form of, in particular, maleic anhydride, itaconic anhydride and citraconic anhydride.

Particularly preferably employed are maleic anhydride and acrylic anhydride, and mixtures thereof. Choice of a suitable mixing ratio of the maleic anhydride, which is hydrolyzed slower, with acrylic anhydride, which is hydrolyzed faster, makes it possible to adjust the hydrolysis resistance of the produced capsules over a wide range. The molar ratio of maleic anhydride to acrylic anhydride is preferably from 1:10 to 10:1, particularly preferably from 1:5 to 5:1. It is also possible and preferred to employ methacrylic anhydride in place of acrylic anhydride. The amount of component (a) may vary within a wide range from 5 to 100%, preferably 10 to 80%, in particular 10 to 60%, of the total weight of monomers. Component (a) can moreover preferably consist of maleic anhydride, acrylic anhydride, methacrylic anhydride and mixtures thereof. Acrylic anhydride and/or methacrylic anhydride is/are particularly preferably used.

The group (b) monomers are employed where appropriate and may comprise up to 95% by weight of the monomer mixtures employed for the polymerization. These are monoethylenically unsaturated monomers which are different from the group (a) monomers and which do not react under the polymerization conditions with the anhydride groups in the (a) monomers. Examples of suitable monomers of this type are acrylic or methacrylic esters of monohydric $C_1$–$C_{24}$-alcohols, for example methyl acrylate, methyl methacrylate, ethyl acrylate, ethyl methacrylate, n-propyl acrylate, n-propyl methacrylate, isopropyl acrylate, isopropyl methacrylate, n-butyl acrylate, isobutyl acrylate, tert-butyl acrylate, n-butyl methacrylate, isobutyl methacrylate, tert-butyl methacrylate, octyl acrylate, octyl methacrylate, 2-ethylhexyl acrylate, 2-ethylhexyl methacrylate, lauryl acrylate, lauryl methacrylate, stearyl acrylate, palmityl acrylate, stearyl methacrylate and palmityl methacrylate, styrene, α-methylstyrene, vinyl acetate, vinyl propionate, vinylpyridine, methacrylonitrile, methacrylamide, N-methacrylamide, dimethylaminopropylmethacrylamide, cyclohexyl acrylate, cyclohexyl methacrylate, phenyl acrylate, phenyl methacrylate, dimethylaminoethyl acrylate, dimethylaminoethyl methacrylate, vinylcyclohexane, vinyl chloride, vinylidene chloride, 2-hydroxypropyl acrylate and 2-hydroxypropyl methacrylate.

If group (b) monomers are employed in the polymerization, they are used in amounts of up to 95% by weight, preferably up to 90% by weight. Preferably employed group (b) monomers are methyl methacrylate, methyl acrylate, ethyl acrylate, ethyl methacrylate, styrene, vinyl acetate and vinylpyridine.

Suitable group (c) monomers are crosslinking monomers which have at least two nonconjugated monoethylenic double bonds in the molecule. Examples of compounds of this type are acrylic and methacrylic esters derived from dihydric alcohols containing 2 to 24 carbon atoms, e.g. ethylene glycol diacrylate, ethylene glycol dimethacrylate, propylene glycol dimethacrylate, 1,4-butanediol diacrylate, 1,4-butanediol dimethacrylate, 1,6-hexanediol diacrylate and 1,6-hexanediol dimethacrylate, divinylbenzene, methallylmethacrylamide, allyl methacrylate, allyl acrylate, methylenebisacrylamide, trimethylolpropane triacrylate, trimethylolpropane trimethacrylate, pentaerytliritol triallyl ether, pentaerytritol tetraacrylate and pentaerythritol tetramethacrylate. As with the monomers of groups (a) and (b), it is also possible to employ the group (c) monomers where appropriate in the form of mixtures. Group (c) monomers are included where appropriate and may comprise up to 80% by weight of the monomer mixture employed for the polymerization.

Group (c) monomers preferably comprise up to 50% by weight of the monomer mixture employed for the polymerization. Use of these monomers has the effect that the microcapsule walls do not dissolve completely in aqueous bases, but only swell to a greater or lesser extent, on exposure thereto. The swelling makes the microcapsule wall more permeable for the bleaching aids so that it is possible to achieve controlled release of the bleaching aid over a lengthy period via the amount of crosslinker employed. In smaller amounts, i.e. up to about 10% by weight of group (c) monomer in the monomer mixture, the effect of a crosslinker is to delay release of the bleaching aid and of the bleaching aid which is dissolved in oil where appropriate after hydrolysis of the shell of the microcapsules. Larger amounts of crosslinker generally result in slower release of the bleaching aid on alkaline hydrolysis. The anhydrides of ethylenically unsaturated monocarboxylic acids also act as crosslinkers, but in this case the crosslinking dissolves with an adjustable delay on contact with water.

The shell of the microcapsules can, where appropriate, be further modified by also using group (d) monomers in the polymerization. Group (d) monomers are polar and readily soluble in water. Examples thereof are acrylic acid, methacrylic acid, acrylamide, hydroxyethyl acrylate, hydroxyethyl methacrylate, vinylsulfonic acid, acrylamidopropanesulfonic acid, styrenesulfonic acid, sulfoethyl acrylate, sulfoethyl methacrylate, sulfopropyl acrylate, sulfopropyl methacrylate and acrylonitrile. This group of monomers may be present where appropriate in the monomer mixtures employed for the polymerization and is used in amounts of up to 20%, preferably up to 10%, of the total weight of the monomers employed.

The microcapsules have according to the invention a thickness such that delayed release of the contained bleaching aid is possible when the microcapsules are introduced into a wash liquor. In this connection, the wall thickness must be such that the contents of the microcapsule are mechanically protected from the surroundings on storage, but it must be possible for the microcapsules to dissolve in the wash liquor. In this connection, the minimum wall thickness required for the microcapsules employed depends on the size and nature of the contained core.

In one embodiment of the invention, the shell of the microcapsule as a proportion of the total weight of microcapsule and contents is from 1 to 50% by weight, preferably 1 to 30% by weight, particularly preferably 2 to 20% by weight. Even a capsule wall which accounts for 50% of the total weight of the microcapsule can dissolve in a wash liquor in the washing process. The capsule wall dissolves sooner in the washing process the thinner it is.

The core of the microcapsules contains an oil which can be emulsified in water. This oil is the solvent or diluent for the monomer mixtures (a) with or without (b) and/or (c) and/or (d) employed in the polymerization. It forms the oil phase of the oil-in-water emulsion present in the polymerization.

The bleaching aid preferably acts as oil phase and is, in one embodiment of the invention, hydrophobic and liquid at room temperature and thus forms an oil which can be emulsified in water. The bleaching aid is preferably an oil which is liquid at the polymerization temperature, and which is only slightly soluble or insoluble in water at this temperature and forms an emulsion. The insolubility in water of the bleaching aid is such that the partition coefficient $\log_{10} P_{ow}$ of the agent between octanol and water is greater than 0.5, preferably greater than 1.0. If the bleaching aid on its own does not form a liquid oil which can be emulsified in water at the polymerization temperature, or at room temperature, the solubility in the aqueous phase can be reduced, for example by adding electrolytes such as salts. Examples thereof are alkali metal sulfates, especially sodium sulfate, and the corresponding silicates or phosphates. It is likewise possible to increase the hydrophobicity by including an oil in which the bleaching aid is dissolved or dispersed. An oil is also added as solvent or dispersant when solid bleaching aids are used.

The substances which can be employed as oil phase are in principle all those which can be emulsified in water as liquids at temperatures between their melting point and the boiling point of water. Substances of this type include all types of oils, such as vegetable oils, animal oils, mineral oils, paraffins, chlorinated paraffins, fluorocarbons and other synthetic oils. Typical examples are sunflower oil, rapeseed oil, olive oil, peanut oil, soybean oil, kerosine, benzene, toluene, butane, pentane, hexane, cyclohexane, chloroform, tetrachloromethane, chlorinated diphenyls and silicone oils. Oils with a high boiling point can also act as core material, eg. dibutyl phthalate, diisohexyl phthalate, dioctyl phthalate, alkylnaphthalenes, dodecylbenzene, terphenyl and partially hydrogenated terphenyls. Apart from said oil substances, most of which have a low molecular weight, it is also possible to employ polymers as core of the microcapsules or as oil phase in the oil-in-water emulsion in the polymerization, as long as the polymers can be emulsified in water. This condition is generally met when the glass transition temperature of the polymers is below the temperature at which the polymers are emulsified in water. Examples of such polymers are acrylic esters derived from monohydric $C_1$–$C_{20}$-alcohols, esters of methacrylic acid derived from monohydric $C_3$–$C_{20}$-alcohols, copolymers of styrene and styrene derivatives, using as comonomers the said alkyl esters of acrylic acid or methacrylic acid, or polyesters, oligomeric polyolefins based on ethylene, propylene, butylene or isobutylene, polyamides and polycarbonates with hydrophobic characteristics. Suitable examples are poly(butyl acrylate), poly(ethylhexyl acrylate), poly(styrene-co-n-butyl acrylate) and cold-polymerized poly(styrene-co-butadiene). It is also possible to use as oil phase mixtures of several oils or mixtures of oils and the polymers which can be emulsified in water. The oil phase may additionally contain the electrolytes described above to increase the hydrophobicity.

The oil phase which contains or consists of the monomers and bleaching aids contributes from 20 to 65, preferably 30 to 60% by weight of the composition of the oil-in-water emulsion subjected to the polymerization. A stable oil-in-water emulsion is required for producing the microcapsules according to the invention. Emulsifiers are used to stabilize the emulsions. Emulsifiers preferred for this purpose are water-soluble polymers which reduce the surface tension of water from 73 mN/m normally to 40–70 mN/m and thus ensure the formation of closed capsule walls. Using high-shear agitators it is possible with these polymers to produce microcapsules with diameters of about 0.5 to 100, preferably 1 to 50, in particular 2 to 20, μm. Microcapsules with a diameter of up to 1000 μm can also be produced using agitators with less shear. The particle size can be controlled via the degree of dispersion.

Protective colloids are likewise employed for stabilizing the oil-in-water emulsion or the oil-in-water suspension produced in the polymerization. Preferred protective colloids are cellulose derivatives such as hydroxyethylcellulose, carboxymethylcellulose, and methylcellulose, polyvinylpyrrolidone and copolymers of N-vinylpyrrolidone, polyvinyl alcohol and partially hydrolyzed polyvinyl acetates. It is also possible to employ gelatin, gum arabic, xanthan, sodium alginate, pectins, partially hydrolyzed starches and casein. The protective colloids are employed either alone or else in the form of mixtures of various protective colloids in amounts of from 0.1 to 10, preferably from 0.5 to 5% of the weight of the aqueous phase of the emulsion.

It is also possible to use ionic emulsifiers to improve the stability of the emulsions. It may be particularly important in this connection for ionic emulsifiers to be present when the content of microcapsules in the dispersion is high, because the microcapsules may readily agglomerate without an additional ionic stabilizer. Suitable and preferred ionic emulsifiers are polyacrylic acid, polymethacrylic acid, copolymers of acrylic acid and methacrylic acid, sulfo-containing, water-soluble polymers with a content of sulfoethyl acrylate, sulfoethyl methacrylate or sulfopropyl methacrylate, and polymers of N-(sulfoethyl)maleimide, 2-acrylamido-2-alkylsulfonic acids, styrenesulfonic acid and formaldehyde, and condensates of phenylsulfonic acid and formaldehyde. The ionic emulsifiers are, as a rule, added in amounts of from 0.1 to 10% of the weight of the aqueous phase of the emulsion. The polymers of monoethylenically unsaturated carboxylic acids or monoethylenically unsaturated sulfonic acids used as emulsifiers have average molecular weights of from 500 to 1,000,000, preferably 1000 to 500,000.

In order to control the molecular weight of the polymers of which the shell consists, it is possible to use molecular weight regulators or polymer chain transfer agents which are normally suitable in polymerization. These are oil-soluble compounds. Examples of suitable compounds of this type are mercaptans such as mercaptoethanol, mercaptopropanol, mercaptobutanols, n-dodecyl mercaptan, mercaptosuccinic acid, mercaptopropionic acid, mercaptoglycerol, mercaptoacetic acid, esters of thioglycolic acids such as hexyl thioglycolate, mercaptoalkylsilanes such as 3-mercaptopropyltrimethoxysilane and 3-mercaptopropyl (methyl)dimethoxysilane, ethers such as dioxane, tetrahydrofuran, tetrahydrofurfuryl alcohol, tetrahydrofurfuryl acetate, alcohols such as isopropanol, n-butanol and n-decanol, and aromatic hydrocarbons such as isopropylbenzene.

Preferably used as regulators are esters of thioglycolic acid such as ethylhexyl thioglycolate and hexyl thioglycolate, and dodecyl mercaptan. If regulators are employed in the polymerization, the amounts thereof are preferably from 0.005 to 1.5% of the total weight of monomers.

The polymerization takes place in the presence of free-radical polymerization initiators. It is possible to use for this purpose all conventional peroxo and azo compounds in the amounts normally employed, e.g. from 0.1 to 5% of the weight of monomers. Preferred polymerization initiators are those soluble in the oil phase or in the monomers. Examples thereof are t-butyl peroxyneodecanoate, t-amyl peroxypivalate, dilauroyl peroxide, t-amyl peroxy-2-ethylhexanoate, 2,2'-azobis(2,4-dimethylvaleronitrile), 2,2'-azobis(2-methylbutyronitrile), dibenzoyl peroxide, t-butyl per-2-ethylhexanoate, t-butyl hydroperoxide, 2,5-dimethyl-2,5-di(t-butylperoxy)hexane and cumene hydroperoxide. Radical initiators which are preferably employed are di(3,5,5-trimethylhexanoyl) peroxide, 4,4'-azobisisobutyronitrile, t-butyl perpivalate and dimethyl 2,2'-azobisisobutyrate. These initiators have a half-life of 10 hours at temperatures in the range from 30 to 100° C. It is also possible to employ water-soluble polymerization initiators or combinations of oil-soluble and water-soluble polymerization initiators.

The polymerization takes place in the oil phase, which contains or consists of the bleaching aid, of a stable oil-in-water emulsion. This emulsion is obtained by, for example, first dissolving the monomers and the polymerization initiator, with or without a polymerization regulator and an emulsifier, in the oil and emulsifying the resulting solution in water. It is moreover possible to add an electrolyte where appropriate to the aqueous phase. The oil phase contains the bleaching aid with or without additional electrolytes and/or additional oil. However, it is also possible initially to emulsify at least one oil in water and then to add to the emulsion the monomers and the radical initiator and, where appropriate, the other auxiliaries also to be used, such as protective colloids or polymerization regulators. In another variant of the process, it is also possible to emulsify the oil and the monomers in water and subsequently to add only the polymerization initiator. The oil phase in all these cases may also contain where appropriate ingredients which are present, e.g. bleaching aids. Since the oil phase in the emulsion is to be microencapsulated as completely as possible, it is preferred to employ only oils whose solubility in water is not too great. The solubility should preferably not exceed 5% by weight. It is expedient for complete microencapsulation of the oil phase of the oil-in-water emulsion to select the monomers on the basis of their solubility in the oil employed. Whereas the monomers are essentially soluble in the oil, polymerization thereof results in polymers which are insoluble in the individual oil droplets and dissolve neither in the oil phase nor in the aqueous phase of the oil-in-water emulsion and thus migrate to the interphase between the oil droplets and the aqueous phase, and thus form the wall material which eventually envelopes the oily core of the microcapsules. Polymerization of the oil-in-water emulsion is normally carried out at from 20 to 100° C., preferably at 40 to 90° C. The polymerization is normally carried out under atmospheric pressure but can also take place under reduced or elevated pressure, eg. in the range from 0.5 to 20 bar. The procedural technique for the process is, as a rule, such that a mixture of water, which contains, where appropriate, electrolytes, protective colloids and/or emulsifiers, oily core materials and monomers is emulsified with a high-speed disperser to the required size, and the stable emulsion is heated with stirring to the temperature at which the radical initiators decompose. The speed of the polymerization can moreover be controlled in a known manner by the choice of the temperature and the amount of radical initiator. The polymerization is expediently continued for from 2 to 6 hours after the polymerization temperature is reached in order to complete conversion of the monomers.

A particularly preferred procedure is one in which the temperature of the polymerizing reaction mixture is increased continuously or periodically during the polymerization. This takes place with the aid of a program with increasing temperature. The total polymerization time can for this purpose be divided into at least two periods. The first polymerization period is characterized by slow decomposition of the radical initiators. In the second polymerization period and, where appropriate, in further polymerization periods, the temperature of the reaction mixture is increased in order to increase the rate of decomposition of the radical initiators. The temperature can be increased in one step or in several steps or continuously in a linear or nonlinear manner. The difference in temperature between the start of the polymerization and the end of the polymerization can be up to 50° C. This difference is generally from 3 to 40, preferably 3 to 30° C. It is not yet possible to give an explanation of why the use of a program with increasing temperature during the polymerization leads to improved microcapsules by comparison with polymerization at approximately constant temperature. However, it is assumed that the reason for this is to be found in the very complex process of polymerization with simultaneous phase separation within the microcapsules.

Depending on the particular system of monomers and oil phase used, various optimal temperature programs may emerge but are unpredictable and have to be found by means of experiments. When a program with increasing temperature is used during the polymerization, a radical initiator will decompose only slowly in the first polymerization period at low temperature. However, fewer radicals per unit time mean that only few polymer chains are initiated and may therefore reach a high molecular weight. Chains of high molecular weight should show very rapid phase separation from the oily core This rapid phase separation may be unfavorable for uniform deposition of the wall material of the microcapsules. It therefore appears worthwhile in many cases to control the molecular weight by also using molecular weight regulators or chain transfer agents.

It is possible to produce by the process according to the invention microcapsules with a very uniform size, i.e. a small size distribution. Microcapsules with a defined diameter are thus accessible. It is moreover possible, by in situ production of the microcapsules around the bleaching aid which is to be enclosed, to obtain capsules with a very uniform and defined wall thickness. The uniform and defined wall thickness makes it possible to adjust the release behavior and the dissolving behavior of the microcapsules in a wash liquor as required. The process according to the invention makes it possible to encapsulate liquids and solids, and solids dispersed in liquids, it being possible easily to adjust the particle size of the microcapsules via the degree of dispersion during the polymerization. It was in this connection unexpected that the microcapsules according to the invention can be obtained even when bleaching aids are used in the core of the microcapsule, although the bleaching aids, especially the bleach activators, may act as polymerization regulators. Thus, by comparison with known processes, microcapsules can be obtained with a considerably more uniform and defined structure and thus a more uniform dissolving behavior, for example in wash liquors. In addition, the material required for the microcapsules can be kept very low, due to the very thin-wall and very dense encapsulation, so that the content of required active substance, in this case of the bleaching aid, in the microcapsules is very high.

In addition to known thermal methods for opening or destroying the shell of microcapsules, it is possible and preferred in the case of the microcapsules according to the invention to destroy the shell of the microcapsules by the action of aqueous bases.

The microcapsules according to the invention which contain in their core a bleaching aid can also be added to a system which already has an alkaline pH, for example washing liquors or cleaning liquors. The microcapsules according to the invention result from the production process according to the invention in the form of dispersions with a solids content of about 65-20, preferably 60-30, % by weight. These dispersions can be used directly, e.g. in liquid detergents and cleaners, or the microcapsules are isolated from the dispersions, for example by spray-drying the dispersions and, where appropriate, agglomerating to granules.

The K values stated in the examples were determined by the method of H. Fikentscher, Cellulose-Chemie, 13 (1932) 58–64 and 71–74 in 1% strength aqueous solution at 25° C.

Bleaching Aids

As indicated above, it is possible according to the invention to use any bleaching aid which can be converted into the form of a hydrophobic oil in the emulsion polymerization.

Hence, the bleaching aid must undergo, either alone or mixed with other components, a phase separation on introduction into an aqueous environment. The bleaching aid is preferably a sufficiently hydrophobic liquid at room temperature or at the polymerization temperature so that it can be employed directly as oil phase in the emulsion polymerization and is present as pure substance in the microcapsules. Thus, in this case, the bleaching aid forms the oil phase which can be emulsified in water. If the bleaching aid is completely or partly miscible with water, ie. its hydrophobicity is too low, it is often possible to bring about the phase separation by adding electrolytes either to the aqueous medium or to the mixture with the aqueous medium. Examples of suitable electrolytes are salts which lead to phase separation, such as alkali metal sulfates, silicates or phosphates, especially sodium sulfate.

If the bleaching aid is not liquid at room temperature or the polymerization temperature, but is in the form of a solid, it can be dissolved or dispersed in an oil which can be emulsified in water. Suitable oils are described above. A combination of electrolyte and additional oil to form the required hydrophobic emulsifier oil component is also possible.

The bleaching aid is in one embodiment of the invention a bleach, a bleach activator or a bleach catalyst.

Suitable bleaches are organic peracids.

Bleach activators are compounds able to form organic peracids, which act as bleaches, with perhydroxyl anions. Bleach catalysts are compounds which increase the rate of formation of peracids or form reactive intermediates, which act as bleaching agent, in a catalytic process.

Suitable known bleach activators are those with the general formulae (I), (II), (III).

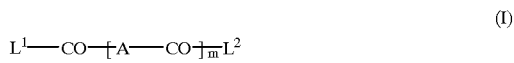

The structures (II) comprise cyclic anhydrides

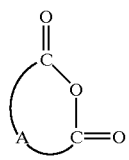

or anthranil derivatives

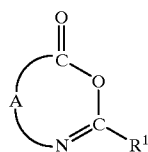

Suitable known bleaches (peracids) have the general formulae (IV) or (V).

In these, $L^1$ is (a) a carboxylic ester residue of the formula

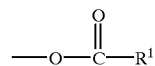

(b) a carboxamide residue of the formula

(c) a phenolate radical of the formula

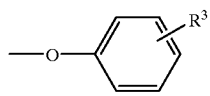

(d) a vinyloxy radical of the formula

—O—CR¹=CHR²

(e) a sulfonamide residue of the formula

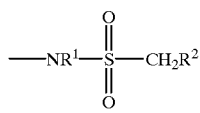

(f) an imidazole residue of the formula

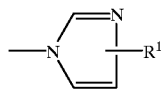

(g) an amidolactam residue of the formula

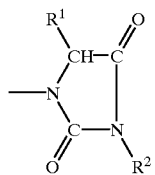

(h) a cyclic carbamate residue of the formula

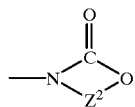

(j) a lactonoxy radical of the formula

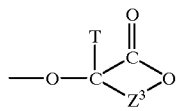

(k) a lactam residue of the formula

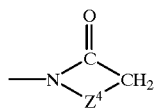

and (l) an oxime group or

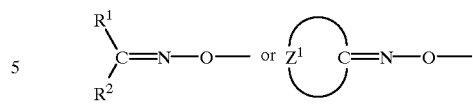

$L^2$ is an $L^1$ radical or an $R^1$ group, where $R^1$ and $R^2$ are hydrogen, $C_1$–$C_{30}$-alkyl, $C_2$–$C_{30}$-alkenyl, $C_5$–$C_{18}$-cycloalkyl, $C_7$–$C_{18}$-aralkyl or $C_6$–$C_{18}$-aryl or -hetaryl, where aliphatic radicals can additionally be functionalized by one to five hydroxyl groups, $C_1$–$C_4$-alkoxy groups, amino groups, $C_1$–$C_4$-alxylamino groups, di-$C_1$–$C_4$-allqlamino groups, chlorine atoms, bromine atoms, nitro groups, cyano groups, carboxyl groups, sulfo groups, carboxy-$C_1$–$C_4$-alkyl groups, carbamoyl groups or phenyl, tolyl or benzyl radicals, where aromatic, cycloaliphatic and heteroaromatic structural units can likewise be substituted by said radicals, or be interrupted by 1 to 8 nonadjacent oxygen atoms, amino groups, $C_1$–$C_4$-alkylamino groups or carbonyl groups, and 1,3-, 1,4-, 1,5-, 1,6-, 1,7- or 1,8-alkylene groups with 3 to 30 carbon atoms which can additionally be functionalized by 1 to 5 hydroxyl groups, $C_1$–$C_4$-alkylamino groups, di-$C_1$–$C_4$-alkylamino groups, chlorine atoms, bromine atoms, nitro groups, cyano groups, carboxyl groups, carbamoyl groups or phenyl, tolyl or benzyl radicals, where aromatic nuclei can in turn likewise be substituted by said radicals, or interrupted by one or two nonadjacent oxygen atoms, amino groups, $C_1$–$C_4$-alkylamino groups or carbonyl groups, $R^3$ is hydrogen, a carboxyl group, a sulfo group or a phosphono group or the alkali metal or ammonium salt thereof, T is hydrogen or $C_1$–$C_4$-alkyl, and $Z^2$ to $Z^4$ are 1,2-, 1,3-, 1,4- or 1,5-alkylene groups with 2 to 20 carbon atoms which can additionally be functionalized by 1 to 3 hydroxyl groups, $C_1$–$C_4$-alkoxy groups, amino groups, $C_1$–$C_4$-alkylamino groups, di-$C_1$–$C_4$-alkylamino groups, chlorine atoms, bromine atoms, nitro groups, cyano groups, carboxyl groups, sulfo groups, carboxy-$C_1$–$C_4$-alkyl groups, carbamoyl groups or phenyl, tolyl or benzyl radicals, where aromatic nuclei can in turn likewise be substituted by said radicals, or interrupted by one or two nonadjacent oxygen atoms, amino groups, $C_1$–$C_4$-alkylamino groups or carbonyl groups, A is a chemical bond or a $C_1$–$C_{18}$-alkylene group, a $C_2$–$C_{18}$-alkenylene group, a $C_5$–$C_{32}$-cycloalkylene group, a $C_7$–$C_{30}$-aralkylene group or a $C_6$–$C_{18}$-arylene group or -hetarylene group, where aliphatic structural units can additionally be functionalized by one to five hydroxyl groups, $C_1$–$C_4$-alkoxy groups, amino groups, $C_1$–$C_4$-alkylamino groups, di-$C_1$–$C_4$-alkylamino groups, chlorine atoms, bromine atoms, nitro groups, cyano groups, carboxyl groups, sulfo groups, carboxy-$C_1$–$C_4$-alkyl groups, carbamoyl groups or phenyl, tolyl or benzyl radicals, where aromatic, cycloaliphatic and heteroaromatic structural units can likewise be substituted by said radicals, or be interrupted by one to eight nonadjacent oxygen atoms, amino groups, $C_1$–$C_4$-alkylamino groups or carbonyl groups, and m is 0 or 1.

Suitable meanings apart from hydrogen for the $R^1$ and $R^2$ radicals, which can be identical or different, are the following:

examples of suitable linear or branched $C_1$–$C_{30}$-alkyl groups are methyl, ethyl, n-propyl, isopropyl, n-butyl, isobutyl, sec-butyl, tert-butyl, n-pentyl, isopentyl, sec-pentyl, tert-pentyl, neopentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl or n-eicosyl; $C_1$–$C_{12}$-alkyl groups are preferred; especially $C_1$–$C_4$-alkyl groups;

examples of suitable linear or branched $C_2$–$C_{30}$-alkenyl groups are vinyl, allyl, 2-methyl-2-propenyl or the corresponding radical derived from oleic acid, linoleic acid or linolenic acid; $C_2$–$C_6$-alkenyl and $C_{16}$–$C_{22}$-alkenyl groups are preferred;

particularly suitable $C_5$–$C_{18}$-cycloalkyl groups are $C_5$–$C_{10}$-cycloalkyl groups, e.g. cyclopentyl, cyclohexyl, 2-, 3- or 4-methylcyclohexyl, 2,3-, 2,4-, 2,5- or 2,6-dimethylcyclohexyl, cycloheptyl or cyclooctyl;

particularly suitable $C_7$–$C_{18}$-aralkyl, especially $C_7$–$C_{12}$-aralkyl, groups are alkyl-substituted phenylalkyl groups, e.g. benzyl, 2-, 3- or 4-methylbenzyl, 2-phenylethyl, 3-phenylpropyl, 4-phenylbutyl, 2-, 3- or 4-ethylbenzyl, 3- or 4-isopropylbenzyl or 3- or 4-butylbenzyl;

examples of suitable $C_6$–$C_{18}$-aryl groups are phenyl, 2-, 3- or 4-biphenylyl, α- or β-naphthyl, 2-, 3- or 4-methylphenyl, 2-, 3- or 4-ethylphenyl, 3- or 4-isopropylphenyl, 3- or 4-butylphenyl or 3- or 4-(2'-ethylhexyl)phenyl; $C_6$–$C_{14}$-aryl groups are preferred, especially phenyl and alkyl-substituted phenyl;

particularly suitable $C_6$–$C_{18}$-hetaryl groups are five- or six-membered $C_6$–$C_{12}$-hetaryl groups with one or two heteroatoms from the group of nitrogen, oxygen and sulfur, examples thereof are:

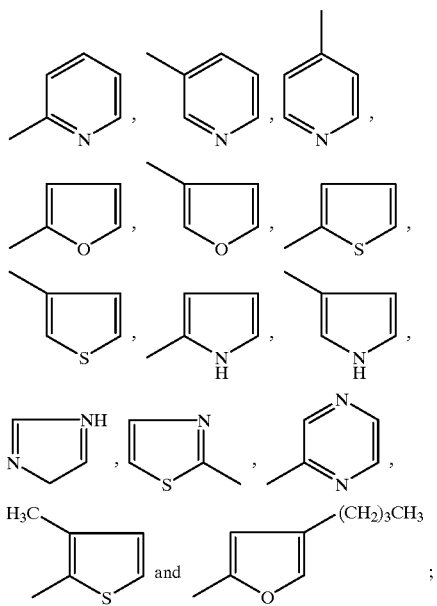

examples of suitable aliphatic radicals interrupted by oxygen or amino groups, especially NH or N(CH$_3$) groups, are the following structures:

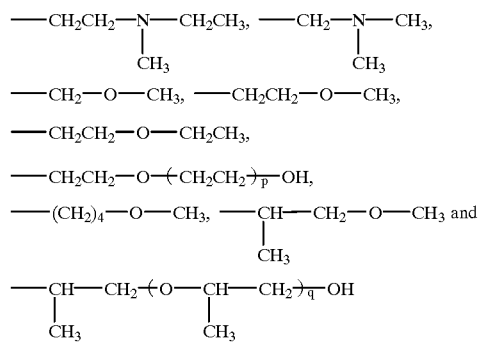

with p=2 to 8 and q=2 to 5.

The variable $Z^1$ in the cyclic oximne groups $L^1$ can be in particular $C_3$–$C_{12}$-aLoylene groups of the following structures:

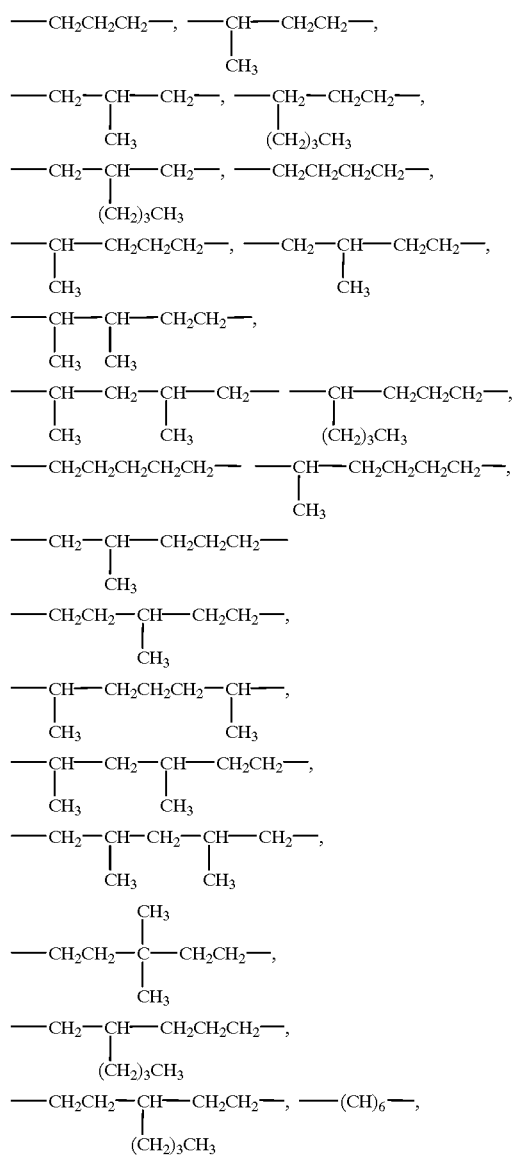

—(CH$_2$)$_7$— or —(CH$_2$)$_8$—, where the variable $Z^1$ can be functionalized or interrpted as stated.

The variables $Z^2$ to $Z^4$ in the heterocyclic systems (h), (j) and (k) can be in particular $C_2$–$C_{10}$-alkylene groups of the following structure:

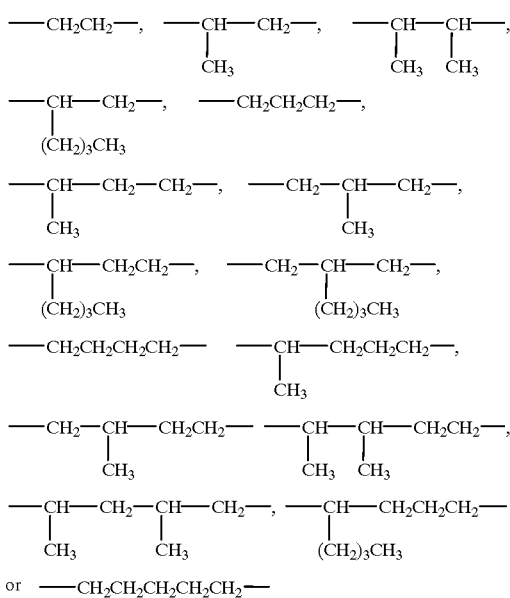

where in the case of unsymmetrical alkylene groups in principle both possible ways of incorporation into the rings are possible. The variables $Z^2$ to $Z^4$ can be functionalized or interrupted as stated.

Particularly suitable carboxylic ester residues (a) for $L^1$ and/or $L^2$ are:

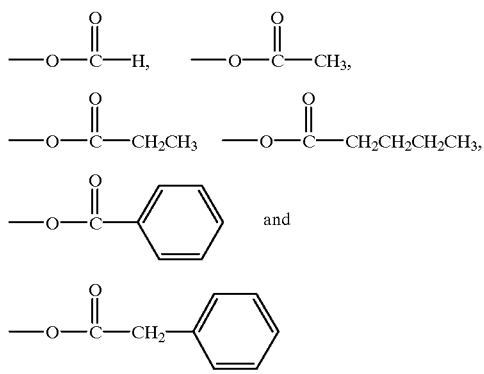

Particularly suitable carboxamide residues (b) for $L^1$ and/or $L^2$ are:

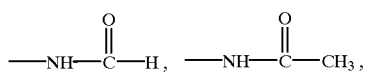

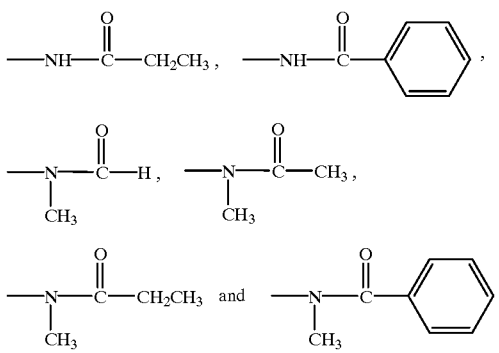

Particularly suitable phenol radicals (c) for $L^1$ and/or $L^2$ are:

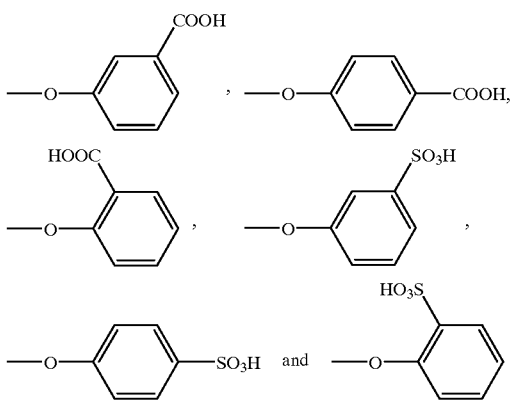

and the relevant sodium or calcium salts.

Particularly suitable vinyloxy radicals (d) for $L^1$ and/or $L^2$ are:

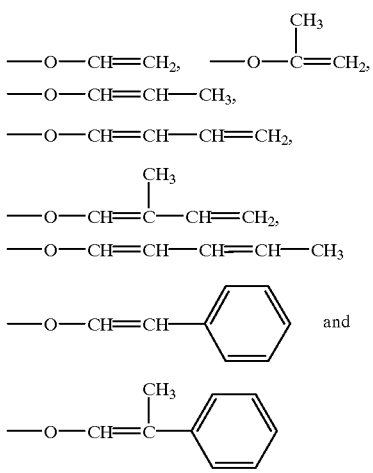

Particularly suitable sulfonamide residues (e) for $L^1$ and/or $L^2$ are:

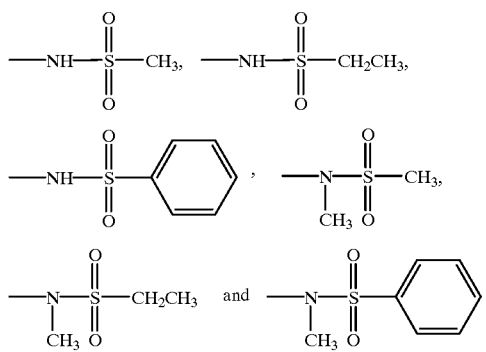

Particularly suitable imidazole residues (f) for $L^1$ and/or $L^2$ are:

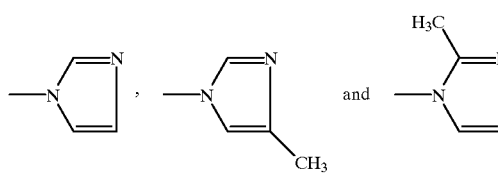

Particularly suitable amidolactam residues (g) for $L^1$ and/or $L^2$ are:

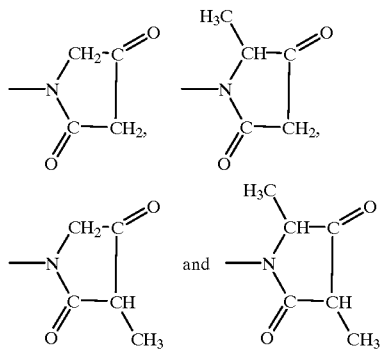

Suitable cyclic carbonate groups (h) for $L^2$ arm:

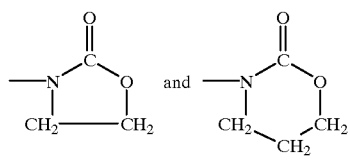

Suitable lactonoxy groups (j) for $L^2$ are:

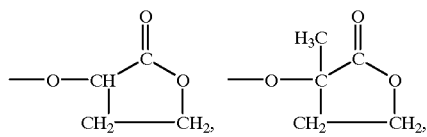

T in the general formula for the lactoneoxy group (j) is preferably hydrogen or methyl.

Suitable lactam groups (k) for $L^2$ are:

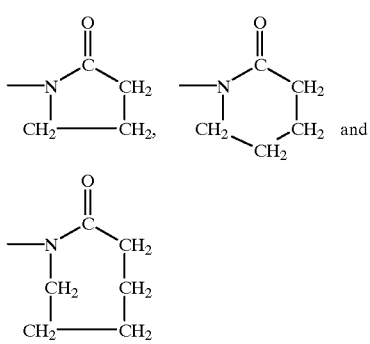

Typical examples for the bridging group A are:

as linear branched $C_1$–$C_{18}$-alkylene groups, in particular $C_6$–$C_{12}$-alkylene groups, methylene, 1,2-ethylene, 1,1-ethylene, 1,3-propylene, 1,2-propylene, 1,1-Propylene, 2,2-propylene, 1,4-butylene, 1,2-butylene, 2,3-butylene, pentamethylene, 3-methyl-1,5-pentylene, hexamethylene, heptamethylene, octamethylene, nonamethylene, decamethylene, undecamethylene, dodecamethylene, tetradecamethylene, hexadecamethylene or octadecamethylene may occur;

linear or branched $C_2$–$C_{18}$-alkenylene groups, in particular $C_6$–$C_{12}$-alkenylene groups, which may occur are linkers with one, two or three olefinic double bonds, e.g. 1,2-ethenylene, 1,3-propenylene, 1,4-but-2-enylene, 1,6-hex-3-enylene, 1,8-oct-4-enylene or 1,12-dodec-6-enylene.

Suitable $C_5$–$C_{32}$-cycloalkyene groups, especially $C_5$–$C_{10}$-cycloalkylene groups, are 1,2-, 1,3- or 1,4-cyclohexylene, 1,2-, 1,3- or 1,4-cycloheptylene, 1,2-, 1,3-, 1,4- or 1,5-cyclooctylene or groups of the formula

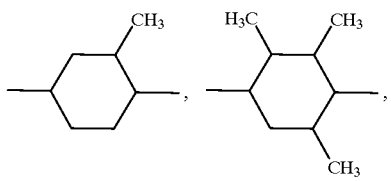

-continued

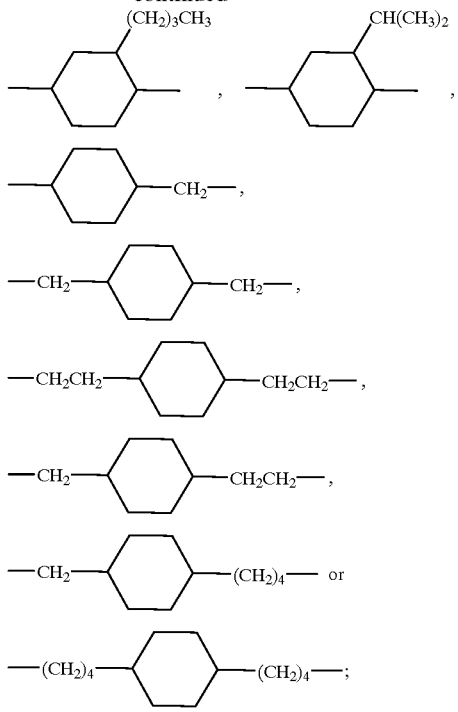

suitable $C_7$–$C_{30}$-aralkylene groups, in particular unsubstituted or alkyl-substituted $C_7$–$C_{22}$-phenylalkyrlene and -diphenyl alklene groups, are groups of the formula

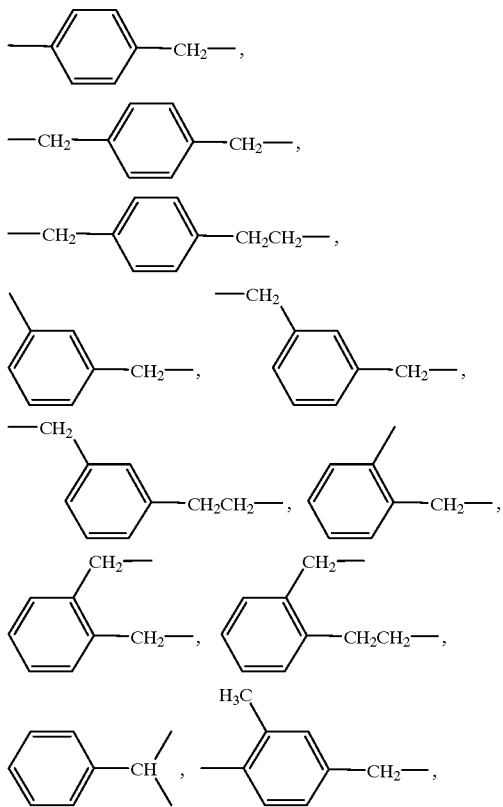

-continued

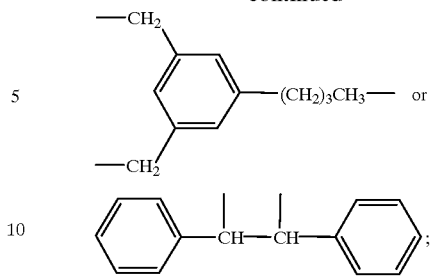

particularly suitable $C_6$–$C_{18}$-arylene groups, in particular unsubstituted or alkyl-substituted phenylene, biphenylylene or naphthylene groups are 1,4-, 1,3- and 1,2-phenylene, but also groups of the formula

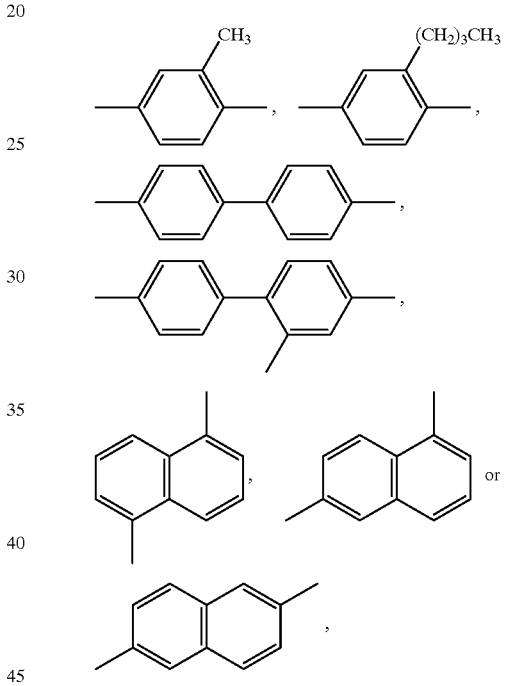

suitable $C_6$–$C_{18}$-hetarylene groups, in particular five- or six-membered $C_6$–$C_{12}$-hetarylene groups with one or two heteroatoms from the group of nitrogen, oxygen and sulfur, are groups of the formula

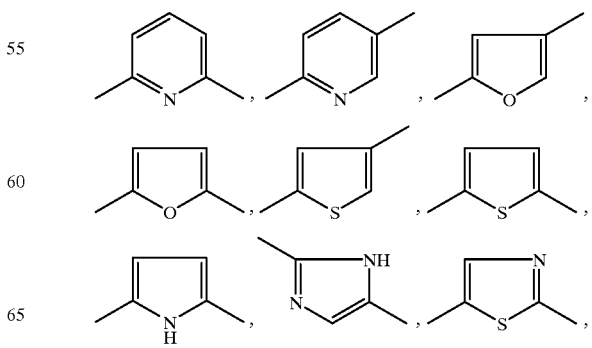

-continued

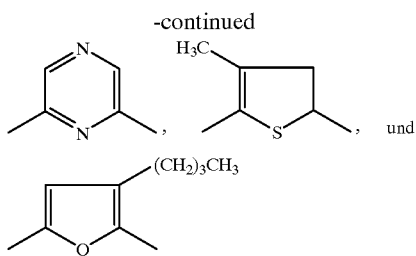

Examples of suitable structures interrupted by oxygen or amino groups, in particular NH or N(CH$_3$) groups, are the following structures:

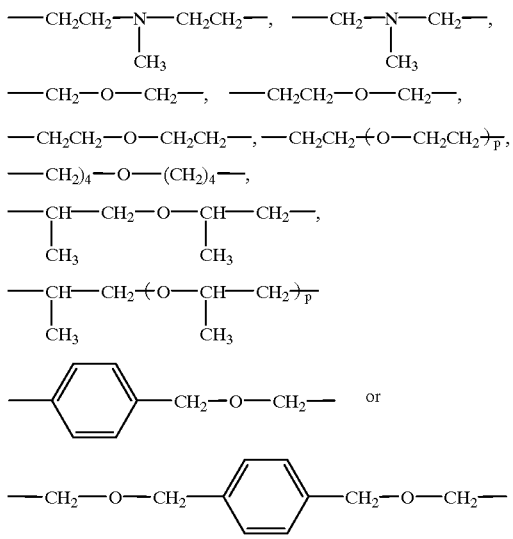

with p=2 to 8 and q=2 to 5.

The linker A is, in particular, a chemical bond (formally derived from oxalic acid) or 1,2-ethylene (derived from succinic acid), 1,4-butylene (derived from adipic acid), hexamethylene (derived from suberic acid), octamethylene (derived from sebacic acid), 1,2-, 1,3- or 1,4-cyclohexylene or 1,2-, 1,3- or 1,4-phenylene (derived from phthalic acid, isophthalic acid and terephthalic acid respectively).

The above-defined variables $R^1$, $R^2$, $Z^1$ to $Z^4$ and A can additionally be functionalized by the stated groups. In this connection, $C_1$–$C_4$-alkoxy groups are, in particular, methoxy, ethoxy, n-propoxy, isopropoxy, n-butoxy, isobutoxy, sec-butoxy or tert-butoxy. Preferred amino groups are —NH$_2$, —NH(CH$_3$), —NH(CH$_2$CH$_3$), —N(CH$_3$)$_2$ and N(CH$_2$CH$_3$)$_2$. Examples of carboxy-$C_1$–$C_4$-alkyl groups are carboxymethyl, carboxyethyl, carboxypropyl, carboxybutyl or carboxy-tert-butyl.

Bleach activators and peracids preferred in one embodiment of the invention are those which are liquid at temperatures up to 100° C. and can be emulsified in an aqueous phase without dissolving to an extent of more than 20% therein. Also particularly suitable are bleach activators and peracids which can be converted by addition of a water-insoluble aid into a phase which can be emulsified in an aqueous phase without dissolving to the extent of more than $C_2$–$C_{12}$-carboxylic acids and $C_4$–$C_{14}$-dicarboxylic acids, O-$C_{2\text{-}14}$-acyl esters of $C_{3\text{-}8}$-ketoximes, N-($C_{2\text{-}14}$-acyloxy) derivatives of cyclic $C_4$–$C_{12}$-carboximides, N-$C_{2\text{-}14}$-acyliminodinitriles or -glycinonitriles, 2-alkyl-, 2-aryl- or 2-aralkylanthranils with $C_{1\text{-}14}$-alkyl radicals, aryl radicals or aralkyl radicals and O-$C_2$–$C_{18}$-acylphenol derivatives.

Percarboxylic acids (bleaches) which are particularly preferred according to the invention are $C_{6\text{-}14}$-alkyl-, aryl- or aralkylpercarboxylic acids, and $C_{6\text{-}20}$-alkylene-, arylene- or araluylenedipercarboxylic acids.

The microcapsules containing bleaching aids according to the invention can be employed for all applications in which bleach systems are normally employed.

Examples thereof are bleaching steps in washing and cleaning processes, bleaching processes for textiles and chemical pulp and applications in the disinfection sector. In a preferred embodiment of the invention, the microcapsules containing bleaching aids, especially the microcapsules containing bleach activators, are employed in detergents and cleaners which may be in liquid or powder form.

Bleach activators and peracids as bleaches are reactive compounds which may on direct incorporation into detergents and cleaner formulations react with other components of the formulations and thus, on the one hand, may decompose other components of the formulation and, on the other hand, no longer display their full activity at the time of use. For example, bleach activators may undergo hydrolysis reactions with the alkaline components of detergents and cleaners. This problem occurs especially when liquid bleaching aids which may migrate in a detergent and cleaner formulation in powder form are employed.

The encapsulation of the bleaching aids in microcapsules results, on the one hand, in them being converted into a solid form which can be handled better, especially in detergents and cleaners in powder form, and, on the other hand, in them, and the other ingredients of the formulation, being effectively protected from reactions and alterations.

It is additionally possible by using the microcapsules to achieve a controlled or delayed release of the bleaching aids in the washing or cleaning process when the polymer walls of the microcapsules are broken down by the action of bases. This suppresses an uncontrolled action of the bleaching aids.

The invention also relates to detergents and cleaners which comprise the microcapsules containing bleaching aids according to the invention.

The described microcapsules can be combined with virtually all conventional components for textile laundering, bleaching and cleaning domestically and commercially. It is possible in this way, for example, to design compositions specifically suitable for textile treatment at low temperatures, and those suitable in several ranges of temperature up to the traditional boiling wash.

The main ingredients of detergents, bleaches and cleaners are, besides peroxy compounds and activators, builders, ie. inorganic builders and/or organic cobuilders, and surfactants, especially anionic and/or nonionic surfactants. These compositions may also contain other conventional auxiliaries and accompanying substances such as fillers, complexing agents, phosphates, dyes, corrosion inhibitors, antiredeposition agents and/or soil release polymers, color transfer inhibitors, bleach catalysts, peroxide stabilizers, electrolytes, optical brighteners, enzymes, perfume oils, foam regulators and activating substances, if expedient.

Inorganic Builders

Suitable inorganic builder substances are all conventional inorganic builders such as aluminosilicates, silicates, carbonates and phosphates.

Examples of suitable inorganic builders are aluninosilicates with ion-exchanging properties such as zeolites. Various types of zeolites are suitable, especially zeolites A, X, B, P, MAP and HS in their Na form or in forms in which Na is partly replaced by other cations such as Li, K, Ca, Mg or ammonium. Suitable zeolites are described, for example, in EP-A 0 038 591, EP-A 0 021 491, EP-A 0 087 035, U.S. Pat. No. 4,604,224, GB-A 20 13 259, EP-A 0 522 726, EP-A 0 384 070 and WO 94/24 251.

Other suitable inorganic builders, are, for example, amorphous or crystalline silicates such as amorphous disilicates, crystalline disilicates such as the sheet silicate SKS-6 (manufactured by Hoechst). The silicates can be employed in the form of their alkali metal, alkaline earth metal or ammonium salts. Na, Li and Mg silicates are preferably employed.

Anionic Surfactants

Examples of suitable anionic surfactants are fatty alcohol sulfates of fatty alcohols with 8 to 22, preferably 10 to 18, carbon atoms, e.g. $C_9$–$C_{11}$-alcohol sulfates, $C_{12}$–$C_{13}$-alcohol sulfates, cetyl sulfate, myristyl sulfate, palmityl sulfate, stearyl sulfate and tallow fatty alcohol sulfate.

Other suitable anionic surfactants are sulfated ethoxylated $C_8$–$C_{22}$-alcohols (alkyl ether sulfates) and their soluble salts. Compounds of this type are prepared, for example, by initially alkoxylating a $C_8$–$C_{22}$-, preferably $C_{10}$–$C_{18}$-alcohol, e.g. a fatty alcohol, and subsequently sulfating the alkoxylation product. Ethylene oxide is preferably used for the alkoxylation, in which case from 2 to 50, preferably 3 to 20, mol of ethylene oxide are employed per mole of fatty alcohol. However, the alcohols can also be alkoxylated with propylene oxide, alone or together with butylene oxide. Also suitable are those alkoxylated $C_8$–$C_{22}$-alcohols which contain ethylene oxide and propylene oxide or ethylene oxide and butylene oxide. The alkoxylated $C_8$–$C_{22}$-alcohols may contain the ethylene oxide, propylene oxide and butylene oxide units in the form of blocks or in random distribution.

Other suitable anionic surfactants are alkane sulfonates such as $C_8$–$C_{24}$-, preferably $C_{10}$–$C_{18}$-alkanesulfonates, and soaps such as the salts of $C_8$–$C_{24}$-carboxylic acids.

Other suitable anionic surfactants are linear $C_9$–$C_{20}$-alkylbenzenesulfonates (LAS).

The anionic surfactants are preferably added to the detergent in the form of salts. Suitable cations in these salts are alkali metal ions such as sodium, potassium and lithium and ammonium ions such as hydroxyethylammonium, di(hydroxyethyl)ammonium and tri(hydroxyethyl) ammonium ions.

Nonionic Surfactants

Examples of suitable nonionic surfactants are alkoxylated $C_8$–$C_{22}$-alcohols such as fatty alcohol alkoxylates or oxo alcohol alkoxylates. The alkoxylation can be carried out with ethylene oxide, propylene oxide and/or butylene oxide. It is possible to employ as surfactant in this case all alkoxylated alcohols which contain at least two molecules of an abovementioned alkylene oxide in the adduct. Also suitable in this case are block copolymers of ethylene oxide, propylene oxide and/or butylene oxide, or adducts which contain said alkylene oxides in random distribution. From 2 to 50, preferably 3 to 20, mol of at least one alkylene oxide are used per mole of alcohol. Ethylene oxide is preferably employed as alkylene oxide. The alcohols preferably have 10 to 18 carbon atoms.

Another class of suitable nonionic surfactants comprises alkylphenol ethoxylates with $C_6$–$C_{14}$-alkyl chains and 5 to 30 mol of ethylene oxide units.

Another class of nonionic surfactants comprises alkyl polyglucosides with 8 to 22, preferably 10 to 18 carbon atoms in the alkyl chain. These compounds usually contain 1 to 20, preferably 1.1 to 5, glucoside units.

Another class of nonionic surfactants comprises N-alkylglucamides of the general structure (VI) or (VII)

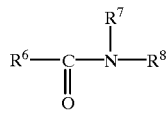

(VI)

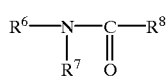

(VII)

where $R^6$ is $C_6$–$C_{22}$-alkyl, $R^7$ is H or $C_1$–$C_4$-alkyl and $R^8$ is a polyhydroxyal radical with 5 to 12 carbon atoms and at least 3 hydroxyl groups. It is preferred for $R^6$ to be $C_{10}$–$C_{18}$-alkyl, $R^7$ to be methyl and $R^8$ to be a $C_5$- or $C_6$ radical. Compounds of this type are obtained, for example, by acylating reductively aminated sugars with $C_{10}$–$C_{18}$-carbonyl chlorides.

The detergents according to the invention preferably contain $C_{10}$–$C_{16}$-alcohols ethoxylated with 3–12 mol of ethylene oxide, particularly preferably ethoxylated fatty alcohols, as nonionic surfactants.

Organic Cobuilders

Examples of low molecular weight polycarboxylates suitable as organic cobuilders are:

$C_4$–$C_{20}$-di-, -tri- and -tetracarboxylic acids such as succinic acid, propanetricarboxylic acid, butanetetracarboxylic acid, cyclopentanetetracarboxylic acid and alkyl- and alkylenesuccinic acids with $C_2$–$C_{16}$-alkyl or -alkylene radicals;

$C_4$–$C_{20}$-hydroxy carboxylic acids such as maleic acid, tartaric acid, gluconic acid, glutaric acid, citric acid, lactobionic acid and sucrose mono-, -di- and tricarboxylic acids;

amino polycarboxylates such as nitrilotriacetic acid, methylglycinediacetic acid, alaninediacetic acid, ethylenediaminetetraacetic acid and serinediacetic acid;

salts of phosphonic acids such as hydroxyethanediphosphonic acid, ethylenediaminetetra (methylenephosphonate) and diethylenetriaminepenta (methylenephosphonate).

Examples of suitable oligomeric or polymeric polycarboxylates as organic cobuilders are:

oligomaleic acids as described, for example, in EP-A 0 451 508 and EP-A 0 396 303.

Co- and terpolymers of unsaturated $C_4$–$C_8$-dicarboxylic acids, possible comonomers being monoethylenically unsaturated monomers from group (i) in amounts of up to 95% by weight from group (ii) in amounts of up to 60% by weight from group (iii) in amounts of up to 20% by weight.

Examples of suitable unsaturated $C_4$–$C_8$-dicarboxylic acids in this connection are maleic acid, fumaric acid, itaconic acid and citraconic acid. Maleic acid is preferred.

Group (i) comprises monoethylenically unsaturated $C_3$–$C_8$-monocarboxylic acids such as acrylic acid, methacrylic acid, crotonic acid and vinylacetic acid. Acrylic acid and methacrylic acid are preferably employed from group (i).

Group (ii) comprises monoethylenically unsaturated $C_2$–$C_{22}$-olefins, vinyl alkyl ethers with $C_1$–$C_8$-alkyl groups, styrene, vinyl esters of $C_1$–$C_8$-carboxylic acids, (meth) acrylamide and vinylpyrrolidone. $C_2$–$C_6$-olefins, vinyl alkyl ethers with $C_1$–$C_4$-alkyl groups, vinyl acetate and vinyl propionate are preferably employed from group (ii).

Group (iii) comprises (meth)acrylic esters of $C_1$–$C_8$-alcohols, (methyl)acrylonitrile, (meth)acrylamides of $C_1$–$C_8$-amines, N-vinylformamide and vinylimidazole.

If the group (ii) polymers contain vinyl ester units, these can also be partly or completely hydrolyzed to vinyl alcohol structural units. Suitable co- and terpolymers are disclosed, for example, in U.S. Pat. No. 3,887,806 and SE-A 43 13 909.

Suitable copolymers of dicarboxylic acids as organic cobuilders are preferably:

copolymers of maleic acid and acrylic acid in the ratio of from 10:90 to 95:5 by weight, particularly preferably those in the ratio of from 30:70 to 90:10 by weight, with molecular weights of from 10,000 to 150,000;

terpolymers of maleic acid, acrylic acid and a vinyl ester of a $C_1$–$C_3$-carboxylic acid in the ratio of from 10 (maleic acid):90 (acrylic acid+vinyl ester) to 95 (maleic acid):10 (acrylic acid+vinyl ester) by weight, where the ratio of acrylic acid to vinyl ester may vary in the range from 20:80 to 80:20 by weight, and particularly preferably terpolymers of maleic acid, acrylic acid and vinyl acetate or vinyl propionate in the ratio of from 20 (maleic acid):80 (acrylic acid+vinyl ester) to 90 (maleic acid):10 (acrylic acid+vinyl ester) by weight, where the ratio of acrylic acid to the vinyl ester may vary in the range from 30:70 to 70:30 by weight;

copolymers of maleic acid with $C_2$–$C_8$-olefins in the molar ratio of from 40:60 to 80:20, with copolymers of maleic acid with ethylene, propylene or isobutene in the molar ratio 50:50 being particularly preferred.

Graft copolymers of unsaturated carboxylic acids on low molecular weight carbohydrates or hydrogenated carbohydrates, cf. U.S. Pat. No. 5,227,446, DE-A 44 15 623, DE-A 43 13 909, are likewise suitable as organic cobuilders.

Examples of unsaturated carboxylic acids which are suitable in this connection are maleic acid, fumaric acid, itaconic acid, citraconic acid, acrylic acid, methacrylic acid, crotonic acid and vinylacetic acid, and mixtures of acrylic acid and maleic acid, which are grafted on in amounts of from 40 to 95% of the weight of the component to be grafted.

It is additionally possible for up to 30% by weight, based on the component to be grafted, of other monoethylenically unsaturated monomers to be present in the polymer for modification. Suitable modifying monomers are the above-mentioned monomers of groups (ii) and (iii).

Suitable as grafting base are degraded polysaccharides such as acidically or enzymatically degraded starches, inulins or cellulose, reduced (hydrogenated or reductively aminated) degraded polysaccharides such as mannitol, sorbitol, aminosorbitol and glucamine, and polyalkylene glycols with molecular weights of up to $M_w$=5000 such as polyethylene glycols, ethylene oxide/propylene oxide or ethylene oxide/butylene oxide block copolymers, random ethylene oxide/propylene oxide or ethylene oxide/butylene oxide copolymers, alkoxylated mono- or polyhydric $C_1$–$C_{22}$-alcohols, cf. U.S. Pat. No. 4,746,456.

Preferably employed from this group are grafted degraded or degraded reduced starches and grafted polyethylene oxides, employing from 20 to 80% by weight of monomers based on the grafting component in the graft copolymerization. A mixture of maleic acid and acrylic acid in the ratio of from 90:10 to 10:90 by weight is preferably employed for grafting.

Polyglyoxylic acids as organic cobuilders are described, for example, in EP-B 0 001 004, U.S. Pat. No. 5,399,286, DE-A 41 06 355 and EP-A 0 656 914. The end groups of the polyglyoxylic acids may have different structures.

Polyamidocarboxylic acids and modified polyamidocarboxylic acids as organic cobuilders are disclosed, for example, in EP-A 0 454 126, EP-B 0 511 037, WO 94/01486 and EP-A 0 581 452.

Also preferably used as organic cobuilders are polyaspartic acid or cocondensates of aspartic acid with other amino acids, $C_4$–$C_{25}$-mono- or -dicarboxylic acids and/or $C_4$–$C_{25}$-mono- or -diamines. Polyaspartic acids modified with $C_6$–$C_{22}$-mono- or -dicarboxylic acids or with $C_6$–$C_{22}$-mono- or -diamines are particularly preferably employed.

Condensates of citric acid with hydroxy carboxylic acids or polyhydroxy compounds as organic cobuilders are disclosed, for example, in WO-A 93/22362 and WO 92/16493. Such carboxyl-containing condensates normally have molecular weights of up to 10,000, preferably up to 5000.

Antiredeposition Agents and Soil Release Polymers

Examples of suitable soil release polymers and/or antiredeposition agents for detergents are:

polyesters from polyethylene oxides with ethylene glycol and/or propylene glycol and aromatic dicarboxylic acids or aromatic and aliphatic dicarboxylic acids;

polyesters from polyethylene oxides, which are endgroup-capped at one end, with di- and/or polyhydric alcohols and dicarboxylic acids.

Polyesters of this type are disclosed, for example, in U.S. Pat. No. 3,557,039, GB-A 11 54 730, EP-A 0 185 427, EP-A 0 241 984, EP-A 0 241 985, EP-A 0 272 033 and U.S. Pat. No. 5,142,020.

Other suitable soil release polymers are amphiphilic graft or other copolymers of vinyl and/or acrylic esters on polyalkylene oxides (cf. U.S. Pat. No. 4,746,456, U.S. Pat. No. 4,846,995, DE-A 37 11 299, U.S. Pat. No. 4,904,408, U.S. Pat. No. 4,846,994 and U.S. Pat. No. 4,849,126) or modified celluloses such as methylcellulose, hydroxypropylcellulose or carboxymethylcellulose.

Color Transfer Inhibitors

Examples of color transfer inhibitors employed are homo- and copolymers of vinylpyrrolidone, of vinylimidazole, of vinyloxazolidone and of 4-vinylpyridine N-oxide with molecular weights of from 15,000 to 100,000, and crosslinked fine-particle polymers based on these monomers. This use of such polymers is known, cf. DE-B 22 32 353, DE-A 28 14 287, DE-A 28 14 329 and DE-A 43 16 023.

Enzymes

Suitable enzymes are proteases, lipases, amylases and cellulases. The enzyme system may be confined to a single one of the enzymes or comprise a combination of different enzymes.

Use in Detergents and Bleaches for Textile Laundering

The microcapsules containing bleaching aids to be used according to the invention are preferably employed in powder or granule detergents. These may be classical heavy duty detergents or concentrated or compacted detergents.

A typical powder or granule (heavy duty) detergent according to the invention containing bleaching aids in microcapsules may have, for example, the following composition:

0.5–50, preferably 5–30% by weight of at least one anionic and/or nonionic surfactant, the detergent formulation preferably containing 8% by weight of LAS, particularly preferably not more than 4% by weight of LAS, 0.5–60, preferably 15–40% by weight of at least one inorganic builder, 0–20, preferably 0.5–8% by weight of at least one organic cobuilder, 0–35, preferably 5–30% by weight of perborate or percarbonate, 0.01–30, preferably 0.5–10% by weight of microcapsules according to the invention, preferably containing bleaching aid, 0–5% by weight, preferably 0–2.5% by weight, of a polymeric color transfer inhibitor, 0–1.5% by weight, preferably 0.01–1.0% by weight, of protease, 0–1.5% by weight, preferably 0.01–1.0% by weight, of other detergent enzymes, 0–1.5% by weight, preferably 0.2–1.0% by weight, of a soil release polymer and/or antiredeposition agent, and 100% conventional auxiliaries and water.

The individual detergent components are described in more detail below:

inorganic builders preferably employed in detergents are sodium carbonate, sodium bicarbonate, zeolites A and P, and amorphous and crystalline Na silicates.

Organic cobuilders preferably employed in detergents are acrylic acid/maleic acid copolymers, acrylic acid/maleic acid/vinyl ester terpolymers and citric acid.

Inorganic bleaches preferably employed in detergents are sodium perborate and sodium carbonate perhydrate.

Inorganic surfactants preferably employed in detergents are fatty alcohol sulfates in some cases, linear alkylbenzenesulfonates (LAS) and soaps, with the LAS content preferably being below 8% by weight, particularly preferably below 4% by weight.

Nonionic surfactants preferably employed in detergents are $C_{11}$–$C_{17}$ oxo alcohol ethoxylates with 3–13 ethylene oxide units, $C_{10}$–$C_{16}$ fatty alcohol ethoxylates with 3–13 ethylene oxide units, and fatty or oxo alcohols additionally alkoxylated with 1–4 propylene oxide or butylene oxide units.

Enzymes preferably employed in detergents are protease, lipase and cellulase. The amounts of commercial enzymes usually added to the detergent are from 0.1 to 1.5% by weight, preferably 0.2 to 1.0% by weight, of the formulated enzyme. Examples of suitable proteases are Savinase and Esperase (manufactured by Novo Nordisk). An example of a suitable lipase is Lipolase (manufactured by Novo Nordisk). An example of a suitable cellulase is Celluzym (manufactured by Novo Nordisk).

Antiredeposition agents and soil release polymers preferably employed in detergents are graft copolymers of vinyl acetate on polyethylene oxide of molecular weight 2500–8000 in the ratio 1.2:1 to 3.0:1 by weight, polyethylene terephthalates/oxyethylene terephthalates of molecular weight 3000 to 25,000 from polyethylene oxides of molecular weight 750 to 5000 with terephthalic acid and ethylene oxide and a molar ratio of polyethylene terephthalate to polyoxyethylene terephthalate of from 8:1 to 1:1, and block polycondensates disclosed in DE-A 44 03 866.

Color transfer inhibitors preferably employed in detergents are soluble vinylpyrrolidone and vinylimidazole copolymers with molecular weights above 25,000, and fine-particle crosslinked polymers based on vinylimldazole.

The powder or granular detergents according to the invention may contain up to 60% by weight of inorganic fillers. However, the detergents according to the invention preferably contain only up to 20% by weight, particularly only up to 8% by weight, of fillers.

The detergents according to the invention may have apparent densities varying in the range from 300 to 1200, in particular 500 to 950 g/l. Modern compacted detergents as a rule have high apparent densities and a granular structure.

Besides combined detergents and bleaches, suitable formulations of the described activators for textile laundering are also compositions which are used as additives to peroxide-containing or peroxide-free detergents. They essentially contain activator or a mixture of activator and peroxy compound and, where appropriate, other auxiliaries and additives, especially stabilizers, pH regulators, thickeners and surfactants.

The present invention also relates to bleach additives for textile laundering which contain 1 to 30% by weight, preferably 5 to 25% by weight, based on the total amount of the additive composition, of the microcapsules.

Typical bleach additives of this type have the following composition, for example:

5–50% by weight, preferably 15–35% by weight, of inorganic peroxy compound, 0.01–30% by weight, preferably 1–30% by weight, particularly preferably 5–25% by weight, of the microcapsules containing bleaching aids, 0–5% by weight, preferably 0.1–3% by weight, of peroxide stabilizers, 0–40% by weight, preferably 5–30% by weight, of pH regulators, and 100% by weight of other conventional auxiliaries and additives.

The present invention also relates to dishwashing compositions which contain 0.01–15% by weight, preferably 0.1–10% by weight, in particular 0.5–5% by weight, in each case based on the total amount of the composition, of the microcapsules in addition to ingredients customary for this purpose.

Compositions intended for cleaning hard surfaces generally contain, besides peroxy compound and activator, in particular surfactants, builders and, in the case of polishing and scouring compositions, abrasive ingredients. Since these compositions are often used at room temperature, the use of the activators according to the invention in this case has a particularly advantageous effect on the bleaching and germicidal action.

Formulated compositions are particularly important for application in disinfection because in this case the requirements for user safety are generally more strict. Disinfectants based on the described activators contain, besides the latter and inorganic peroxy compounds, generally also other auxiliaries and additives such as pH regulators, stabilizers and surfactants. In special cases, they may additionally contain specific microbicides which enhance the intrinsically very broad germicidal action of the activated peroxy compound for particular germs.

The present invention also relates to disinfectants which contain 1–40% by weight, preferably 5–30% by weight, based on the total amount of the composition, of the microcapsules.

Typical disinfectants of this type have the following composition, for example:

5–40% by weight, preferably 10–20% by weight, of inorganic peroxy compound,

1–40% by weight, preferably 5–30% by weight, of the microcapsules,

0–5% by weight, preferably 0.1–3% by weight, of peroxide stabilizers, 0.1–20% by weight, preferably 0.2–5% by weight, of surfactants, and 100% by weight of other auxiliaries and additives.

The use according to the invention of the described microcapsules is, however, by known means confined to the use in formulated form in this described manner or any other. Thus, for example, in the commercial sector there is generally priority on the individual dosage of reagents, because this is often the least expensive method.

It is possible with the microcapsules to achieve a distinct improvement in the bleaching, oxidizing and cleaning action in the lower temperature range with the industrial applications described.

The invention is explained in detail hereinafter by means of examples.

EXAMPLE 1

Preparation of N-octanoylcaprolactam 113 g (1 mol) of ε-caprolactam (purity >99% by weight) are dissolved in 200 ml of toluene in a round-bottom flask. 127 g (1 mol) of N,N-dimethylcyclohexylamine are introduced into this. Then, at 40–70° C., 164.2 g (1 mol) of octanoyl chloride (purity 99% by weight) are added dropwise. The reaction mixture is then stirred at 65–70° C. for one hour. Then, to remove the ammonium salt produced, it is washed first once with 130 ml of hot water and then with 10 ml of concentrated HCl dissolved in 130 ml of hot water. It is subsequently washed 3 more times with 130 ml of hot water in order to maintain a pH of 5–7 in the reaction mixture. The solvent is distilled off under reduced pressure (water pump) at 70–80° C. N-octanoylcaprolactam is obtained as a yellow liquid in 93% yield with a purity of 98%.

EXAMPLE 2

Preparation of Benzoylcaprolactam

The title compound is prepared in a yield of 95% from benzoyl chloride and caprolactam as in Example 1. The purity of the product is 98%.

EXAMPLE 3

Preparation of Octanoyloxysuccinimide 115.1 g (1 mol) of N-hydroxysuccinimide are introduced into 600 ml of toluene in a round-bottom flask, and 127.3 g (1 mol) of dimethylcyclohexylamine are added. At 60° C., 162.5 g (1 mol) of octanoyl chloride in 180 ml of toluene are added dropwise. The reaction mixture is stirred at 60° C. for 5 hours. Subsequently water is added and the organic phase is washed with water, concentrated hydrochloric acid, water and sodium bicarbonate solution in this order. The organic phase is dried over sodium sulfate, filtered and concentrated. The crystallized residue is dried at 40° C./100 mbar. 219 g (90%) of octanoyloxysuccinimide are obtained with a purity of 99.5%.

EXAMPLE 4

Production of Microcapsules Containing N-octanoylcaprolactam

A mixture of 32 g of water 0.84 g of polyvinyl alcohol (88% hydrolyzed, average molecular weight 128,000), 0.84 g of polyvinylpyrrolidone with a K value of 90, 20 g of N-octanoylcaprolactam, 0.27 g of methyl methacrylate, 0.24 g of methacrylic anhydride, 0.007 g of t-butyl perpivalate is dispersed at 8000 rpm with a rod Turrax T25 (Janke und Kunkel, Staufen) at room temperature for one minute. This results in a stable oil-in-water emulsion of particles with diameters of 1–10 μm. This emulsion is heated to 59° C. while agitating with an anchor agitator. The temperature of the oil-in-water emulsion is then increased to 63° C. over the course of one hour and to 80° C. over the course of a further three hours. Most of the microcapsules have a diameter of 3–7 μm, and a few have one of up to 15 μm.

EXAMPLE 5

A mixture of 32 g of water 0.84 g of polyvinyl alcohol (88% hydrolyzed, average molecular weight 128,000), 0.84 g of polyvinylpyrrolidone with a K value of 90, 10 g of white oil 10 g of N-octanoylcaprolactam, 0.27 g of methyl methacrylate, 0.24 g of methacrylic anhydride, 0.007 g of t-butyl perpivalate is dispersed at 8000 rpm with a rod Turrax T25 (Janke und Kunkel, Staufen) at room temperature for one minute. This results in a stable oil-in-water emulsion of particles with diameters of 1–10 μm. This emulsion is heated to 59° C. while agitating with an anchor agitator. The temperature of the oil-in-water emulsion is then increased to 63° C. over the course of one hour and to 80° C. over the course of a further three hours. Most of the microcapsules have a diameter of 2–8 μm, and a few have one of up to 20 μm.

EXAMPLE 6

A mixture of 32 g of water 0.84 g of polyvinyl alcohol (88% hydrolyzed, average molecular weight 128,000), 0.84 g of polyvinylpyrrolidone with a K value of 90, 20 g of N-octanoyloxysuccinimide 0.27 g of methyl methacrylate, 0.24 g of methacrylic anhydride, 0.007 g of t-butyl perpivalate is prepared as in Example 5. Most of the microcapsules have a diameter of from 2 to 10 μm, and a few have one up to 15 μm.

EXAMPLE 7

A mixture of 32 g of water 0.84 g of polyvinyl alcohol (88% hydrolyzed, average molecular weight 128,000), 0.84 g of polyvinylpyrrolidone with a K value of 90, 10 g of diisopropylnaphthalene 10 g of benzoylcaprolactam 0.27 g of methyl methacrylate, 0.24 g of methacrylic anhydride, 0.007 g of t-butyl perpivalate is prepared as in Example 5. Most of the microcapsules have a diameter of from 2 to 5 μm.

The microcapsules containing octanoylcaprolactam from Example 4 were added to heavy duty detergent compositions. The detergent formulations are indicated in the following table. The bleaching action in the washing test after 30 days at room temperature was found to be greater in all the formulations than in the formulation without bleach activator.

TABLE 1

|  | I | II | III | IV | V | VI | VII |
|---|---|---|---|---|---|---|---|
| PVP (K value 30) | 1.5 | | | | | | |
| VI/VP copolymer (K value 30) | | 1.0 | | | 1.0 | 0.6 | |
| AA/MA (70,000) | | 5.0 | 5.0 | | | | |
| AA/MA (10,000) | | | | | | | 5.0 |
| AA/MA/VAc terpolymer (20,000) | | | | | | 5.0 | |
| Oligomaleic acid | | | | | 5.0 | | |
| Na perborate monohydrate | 15 | 15 | | | 15 | | 7.5 |
| Na percarbonate | | | 18 | 15 | | 18 | |
| Activator of Ex. 4 | 4.0 | 3.8 | 5.0 | 5.0 | 2.9 | 4.2 | 2.0 |
| Na lauryl sulfate | 3.5 | 6.0 | 12.0 | 6.0 | | 2.0 | 7.5 |
| Lauryl alcohol 4 EO sulfate Na salt | | | | | 5.5 | | |
| Linear alkylbenzenesulfonate Na salt | | 1.7 | 0.8 | | 7.5 | 4.5 | |
| Soap | 2.8 | 0.6 | 0.4 | 2.5 | 1.5 | | 2.4 |
| C13/C15 oxo alcohol 3 EO | | 3.0 | | | | | |
| C13/C15 oxo alcohol 7 EO | 4.7 | | 4.7 | 13.5 | 4.0 | 6.5 | |
| C13/C15 oxo alcohol 10 EO | | 3.0 | | | | | |
| C12/C14 fatty alcohol 7 EO | | | | | | | 10.0 |
| Lauryl alcohol 13 EO | | | | | | 5.0 | |
| Zeolite A | 25 | 35 | 15 | | 30 | 15 | 35 |
| Zeolite P | | | | 40 | | | |
| SKS-6* | | | 14 | | | 15 | |
| Na disilicate | 2.5 | 3.9 | | 0.5 | 4.5 | | 1.5 |
| Mg silicate | 1.0 | | 0.8 | | 1.0 | 1.0 | 0.6 |
| Sodium sulfate | 20 | 2.5 | 3.2 | 2.0 | 1.5 | 5.5 | 3.4 |
| Sodium bicarbonate | | | 9.0 | 6.5 | | | |
| Sodium carbonate | 12.0 | 13.6 | | | 10.0 | 8.0 | 9.8 |
| Sokalan* HP 22 | | 0.4 | | | 0.5 | | |
| Polyethylene terephthalate/oxyethylene terephthalate | 1.0 | | | | 0.5 | 0.8 | 1.0 |
| Carboxymethylcellulose | 0.6 | 1.3 | 0.6 | 1.0 | 0.6 | 0.6 | 0.5 |
| Dequest* 2046 (Phosphonate) | | | | 0.5 | | | |
| Citric acid | | 6.8 | 5.0 | | | 2.5 | 3.8 |
| Lipase | | | | | 1.0 | | |
| Protease | | 1.0 | | | 1.0 | 0.5 | 0.6 |
| Cellulase | | | | | | | 0.6 |
| Water | to 100 | to 100 | to 100 | to 100 | to 100 | to 100 | to 100 |

Test of the Bleaching Action in the Detergent Formulations according to the Invention To test the action of the microencapsulated bleach activators according to the invention in the detergent formulations according to the invention, washing tests were carried out in the above detergent compositions III with test stains of red wine, tea and chlorophyll on cotton.

The test was carried out in a Launder-O-meter, Atlas Standard type under the conditions indicated in Table 2.

TABLE 2

| Washing conditions | |
|---|---|
| Machine | Launder-O-meter |
| Cycles | 1 |
| Time | 30 min |
| Temperatures | 22° C., 38° C. and 60° C. |
| Water hardness | 3.0 mmol/l |
| Test fabrics | 3 × 2.5 g of various test fabrics (bleached cotton stained with red wine, tea, chlorophyll) 2 × 2.5 g of cotton ballast fabric |
| Amount of liquor | 250 ml |
| Liquor ratio | 1:20 |

TABLE 2-continued

| Washing conditions | |
|---|---|
| Detergent | No. III from Tab. 1 using the activators indicated in Tabs. 3 and 4 |
| Detergent concentration | 4.5 g/l. |

The color strength of the test fabrics was measured by photometry. The reflectances measured on the individual test fabrics at 16 wavelengths 20 nm apart in the range from 400 to 700 nm were used to determine, by the method described in A. Kud, Seifen, Öle, Fette Wachse 119, (1993) 590–594, the particular color strength of the test stains before and after washing, and the absolute bleaching action $A_{abs}$ in % was calculated therefrom.

Large values of $A_{abs}$ indicate a high bleaching action.

The results for the various stains and for the detergent according to the invention by comparison with a detergent in which the activator was employed without microcapsule and with a detergent without activator are indicated in Tables 3 and 4.

TABLE 3

Results of washing tests with soiled fabrics
Numbers are the absolute bleaching action $A_{abs}$ in %

| Bleach activator | Detergent formulation | Tea 22° C. | Tea 38° C. | Red wine 22° C. | Red wine 38° C. | Chlorophyll 22° C. | Chlorophyll 38° C. |
|---|---|---|---|---|---|---|---|
| Example No. 4 (microencapsulated octanoylcaprolactam from Example No. 1, stored as aqueous dispersion for 14 d) | III | 64.1 | 80.9 | 67.9 | 78.1 | 26.1 | 36.6 |
| for comp.: octanoylcaprolactam (pure activator added in the test) | III | 62.1 | 76.5 | 66.5 | 74.6 | 24.5 | 30.0 |
| for comp.: no activator | III | 22.2 | 60.3 | 58.8 | 70.5 | 4.5 | 17.5 |

TABLE 4

| Bleach activator | Detergent formulation | Tea 22° C. | Tea 38° C. | Red wine 22° C. | Red wine 38° C. | Chlorophyll 22° C. | Chlorophyll 38° C. |
|---|---|---|---|---|---|---|---|
| Example No. 8 (microencapsulated n-octanoyloxysuccinimide from Example No. 6) | III | 40.7 | 61.0 | 67.5 | 81.6 | 18.3 | 23.6 |
| for comp.: encapsulated activator from Example 6 | III | 32.1 | 62.8 | 64.1 | 78.8 | 15.2 | 30.6 |
| for comp.: no activator | III | 25.9 | 45.0 | 56.9 | 73.6 | 7.1 | 11.5 |

The results for the bleaching action in Tables 3 and 4 show that the bleaching action in the detergent with the encapsulated bleach activator according to the invention is greater than that of a directly added bleach activator. Moreover the difference becomes more marked on longer storage of the detergent because the bleach decomposes faster with a pure activator without microencapsulation. The bleach activator is not adversely affected by the polymerization for the encapsulation and the storage of the encapsulated dispersion, and the capsule dissolves in a defined fashion under the washing conditions and permits controlled release of the bleach activator.

We claim:

1. A microcapsule containing bleaching aids, obtainable by polymerizing monomer mixtures which comprise
    5–100% by weight of at least one ethylenically unsaturated carboxylic anhydride (a),
    0–95% by weight of at least one monoethylenically unsaturated monomer (b) different from the monomers of group (a),
    0–80% by weight of crosslinking monomers (c) which have at least two nonconjugated monoethylenic double bonds in the molecule, and
    0–20% by weight of water-soluble monoethylenically unsaturated monomers (d),
    where the total of components (a) to (d) is 100% by weight, in the oil phase of a stable oil-in-water emulsion in the presence of free-radical polymerization initiators, where the temperature of the polymerizing reaction mixture ranges from 20–100° C., and where the oil phase contains the bleaching aid.

2. A microcapsule as claimed in claim 1, where the oil phase consists of the bleaching aid.

3. A microcapsule as claimed in claim 1, where the carboxylic anhydrides (a) are selected from internal anhydrides of ethylenically unsaturated dicarboxylic acids and anhydrides of ethylenically unsaturated monocarboxylic acids or mixtures thereof.

4. A microcapsule as claimed in claim 1, where the bleaching aid is a bleach activator and/or bleach catalyst.

5. A process for producing microcapsules containing bleaching aids, wherein monomer mixtures which comprise
    5–100% by weight of at least one ethylenically unsaturated carboxylic anhydride (a),
    0–95% by weight of at least one monoethylenically unsaturated monomer (b) different from the monomers of group (a),
    0–80% by weight of crosslinking monomers (c) which have at least two nonconjugated monoethylenic double bonds in the molecule, and
    0–20% by weight of water-soluble monoethylenically unsaturated monomers (d),
    where the total of components (a) to (d) is 100% by weight, are polymerized in the oil phase of a stable oil-in-water emulsion in the presence of free-radical polymerization initiators, where the temperature of the polymerizing reaction mixture ranges from 20–100° C., and where the oil phase contains the bleaching aid.

6. A process as claimed in claim 5, wherein electrolytes are added to the aqueous phase for producing the oil-in-water emulsion.

7. A detergent or cleaner comprising 0.01–30% by weight of microcapsules as claimed in claim 1 and other conventional ingredients.

8. A detergent or cleaner as claimed in claim 7, comprising
    0.5–50% by weight of at least one anionic and/or nonionic surfactant,
    0.5–60% by weight of at least one inorganic builder,
    0–20% by weight of at least one organic cobuilder,
    0–35% by weight of perborate or percarbonate, 0.1–20% by weight of microcapsules as claimed in claim 1, 0–5% by weight of a polymeric color transfer inhibitor, 0–1.5% by weight of protease, 0–1.5% by weight of other detergent enzymes, 0–1.5% by weight of a soil release polymer and/or antiredeposition agent, and 100% conventional auxiliaries and water.

9. The method controlled releasing of bleaching aids present in the core material of the microcapsules as claimed in claim 1 by destruction of their shell resulting from the action of aqueous bases.

10. The microcapsule of claim 1, wherein said temperature is increased continuously within said range during polymerization.

11. The microcapsule of claim 1, wherein said temperature is periodically increased within said range during polymerization.

12. The microcapsule of claim 1, wherein the oil phase consists of the bleaching aid.

13. The process of claim 5, wherein said temperature during polymerization within said range is continuously increased.

14. The process of claim 5, wherein said temperature during polymerization within said range is periodically increased.

15. The process of claim 5, wherein the oil phase consists of the bleaching aid.

* * * * *